United States Patent
You et al.

(10) Patent No.: US 10,078,174 B2
(45) Date of Patent: Sep. 18, 2018

(54) CURVED LIGHT GUIDE UNIT AND DISPLAY DEVICE HAVING LOW RESTORING FORCE

(71) Applicant: Samsung Display Co., Ltd., Yongin-Si, Gyeonggi-Do (KR)

(72) Inventors: Junwoo You, Seongnam-si (KR); Donghoon Kim, Suwon-si (KR); Sehee Jeon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/269,127

(22) Filed: Sep. 19, 2016

(65) Prior Publication Data

US 2017/0160463 A1 Jun. 8, 2017

(30) Foreign Application Priority Data

Dec. 7, 2015 (KR) .................. 10-2015-0173266

(51) Int. Cl.
*F21V 7/04* (2006.01)
*F21V 8/00* (2006.01)

(52) U.S. Cl.
CPC ......... *G02B 6/0065* (2013.01); *G02B 6/0038* (2013.01); *G02B 6/0058* (2013.01); *G02B 6/0088* (2013.01)

(58) Field of Classification Search
CPC .. G02B 6/0065; G02B 6/0088; G02B 6/0038; G02B 6/0058
See application file for complete search history.

(56) References Cited

U.S. PATENT DOCUMENTS

| | | | |
|---|---|---|---|
| 6,561,665 B1* | 5/2003 | Kim | G09F 13/0409 362/559 |
| 7,866,870 B2 | 1/2011 | Shim et al. | |
| 2010/0315811 A1* | 12/2010 | Chen | F21V 13/04 362/235 |
| 2015/0346538 A1* | 12/2015 | Hsiao | G02F 1/133308 349/58 |

FOREIGN PATENT DOCUMENTS

KR 1020080072344 A 8/2008

* cited by examiner

*Primary Examiner* — Donald Raleigh
(74) *Attorney, Agent, or Firm* — Cantor Colburn LLP

(57) ABSTRACT

A light guide unit includes: a light guide plate curved about a center of curvature, and including a first outer circumferential surface and a first inner circumferential surface disposed closer to the center of curvature than the first outer circumferential surface; and a restoring force-offset layer coupled to at least one of the first outer circumferential surface and the first inner circumferential surface. The light guide plate includes a first material having a first thermal expansion coefficient, and the restoring force-offset layer includes a material having a thermal expansion coefficient different from the first thermal expansion coefficient to offset a restoring force of the light guide plate.

24 Claims, 8 Drawing Sheets

CURVED LIGHT GUIDE UNIT AND DISPLAY DEVICE HAVING LOW RESTORING FORCE

This application claims priority to Korean Patent Application No. 10-2015-0173266, filed on Dec. 7, 2015, and all the benefits accruing therefrom under 35 U.S.C. § 119, the content of which in its entirety is herein incorporated by reference.

BACKGROUND

1. Field

The disclosure relates to a light guide unit and a display device including the light guide unit. More particularly, the disclosure relates to a curved light guide unit and a curved display device including the curved light guide unit.

2. Description of the Related Art

Various display devices used for a multimedia device, such as a television set, a mobile phone, a navigation unit, a computer monitor, a game unit, etc., have been developed.

In recent years, as a user's demand for a variety of display devices increases, a curved or folded display device has been developed. Such a curved or folded display device typically includes a flexible display panel and a variety of functional layers.

SUMMARY

The disclosure provides a curved light guide unit having a low restoring force.

The disclosure provides a display device having a thin thickness.

According to an embodiment of the inventive concept, a light guide unit includes a light guide plate and a restoring force-offset layer. The light guide plate includes a first material having a first thermal expansion coefficient, is curved about a center of curvature, and includes a first outer circumferential surface and a first inner circumferential surface disposed closer to the center of curvature than the first outer circumferential surface. The restoring force-offset layer is coupled to at least one of the first outer circumferential surface and the first inner circumferential surface, and includes a material having a thermal expansion coefficient different from the first thermal expansion coefficient. The restoring force-offset layer offsets a restoring force of the light guide plate.

In an embodiment, the restoring force-offset layer may include a first expansion layer coupled to the first outer circumferential surface, and the first expansion layer may include a second material having a second thermal expansion coefficient greater than the first thermal expansion coefficient to offset the restoring force of the light guide plate.

In an embodiment, a groove may be defined in the first inner circumferential surface and recessed to the first outer circumferential surface.

In an embodiment, the light guide plate may be curved in a first direction, the groove may be provided in a plural number and arranged along the first direction, and each of the grooves may extend substantially parallel to a second direction different from the first direction.

In an embodiment, each of the grooves may include a first inclination surface inclined at a first angle with respect to the first inner circumferential surface and a second inclination surface inclined at a second angle with respect to the first inner circumferential surface, and an end of the first inclination surface may be connected to an end of the second inclination surface.

In an embodiment, the grooves may have a depth becoming greater as a distance thereof from a center from the light guide plate increases and a distance thereof from an edge of the light guide plate decreases.

In an embodiment, the restoring force-offset layer may further include a contraction layer coupled to the first inner circumferential surface and including a third material having a third thermal expansion coefficient smaller than the first thermal expansion coefficient to offset the restoring force of the light guide plate.

In an embodiment, the contraction layer may include a first sub-contraction layer disposed corresponding to the first inner circumferential surface and a second sub-contraction layer disposed corresponding to the groove, and the first and second sub-contraction layers may have a substantially same thickness as each other.

In an embodiment, the contraction layer may be curved about the center of curvature, and include a second outer circumferential surface and a second inner circumferential disposed closer to the center of curvature than the second outer circumferential surface, the groove may be filled with the contraction layer, and the second inner circumferential surface may be substantially parallel to the first inner circumferential surface.

In an embodiment, the first expansion layer may be curved about the center of curvature, and include a second outer circumferential surface and a second inner circumferential disposed closer to the center of curvature than the second outer circumferential surface, the restoring force-offset layer may include a second expansion layer coupled to the second outer circumferential surface and the second expansion layer may include a third material having a third thermal expansion coefficient greater than the second thermal expansion coefficient to offset the restoring force of the light guide plate.

In an embodiment, the first expansion layer may be coupled corresponding to a center of the light guide plate, and the second expansion layer may be coupled corresponding to an edge of the light guide plate.

In an embodiment, the first expansion layer may include a first sub-expansion layer coupled corresponding to a center portion of the light guide plate and a second sub-expansion layer coupled corresponding to an edge portion of the light guide plate, and the first sub-expansion layer may have a first sub-thermal expansion coefficient different from a second sub-thermal expansion coefficient of the second sub-expansion layer.

In an embodiment, the first sub-thermal expansion coefficient of the first sub-expansion layer may be greater than the first thermal expansion coefficient, and the second sub-thermal expansion coefficient of the second sub-expansion layer may be greater than the first sub-thermal expansion coefficient.

In an embodiment, a radius of curvature of the first inner circumferential surface may be smaller than a second radius of curvature of the first outer circumferential surface.

In an embodiment, the restoring force-offset layer may further include a contraction layer coupled to the first inner circumferential surface, and the contraction layer may include a third material having a third thermal expansion coefficient smaller than the first thermal expansion coefficient to offset the restoring force of the light guide plate.

According to another embodiment of the inventive concept, a light guide unit includes a light guide plate and a restoring force-offset member. The light guide plate includes a first material having a first thermal expansion coefficient, is curved to surround a center of curvature, and includes an outer circumferential surface and an inner circumferential surface disposed closer to the center of curvature than the outer circumferential surface. The restoring force-offset member includes a second material having a second thermal expansion coefficient different from the first thermal expansion coefficient to offset a restoring force of the light guide plate. A groove is defined in at least one of the inner circumferential surface and the outer circumferential surface, and the restoring force-offset member is coupled to the groove.

In an embodiment, at least a portion of the groove may be filled with the restoring force-offset member.

In an embodiment, the groove may be defined in the inner circumference surface, and the second thermal expansion coefficient may be smaller than the first thermal expansion coefficient.

In an embodiment, the groove may be defined in the outer circumference surface, and the second thermal expansion coefficient may be greater than the first thermal expansion coefficient.

According to another embodiment of the inventive concept, a display device includes a display panel and a backlight unit disposed below the display panel to provide a light to the display panel. The backlight unit includes a light guide plate and a restoring force-offset layer. The light guide plate includes a first material having a first thermal expansion coefficient, is curved about a center of curvature, and includes an outer circumferential surface and an inner circumferential surface disposed closer to the center of curvature than the outer circumferential surface. The restoring force-offset layer is coupled to at least one of the inner circumferential surface and the outer circumferential surface and includes a material having a thermal expansion coefficient different from the first thermal expansion coefficient to offset a restoring force of the light guide plate.

In an embodiment, the restoring force-offset layer may include an expansion layer coupled to the outer circumferential surface, and the expansion layer may include a second material having a second thermal expansion coefficient greater than the first thermal expansion coefficient to offset the restoring force of the light guide plate.

In an embodiment, the restoring force-offset layer may include a contraction layer coupled to the inner circumferential surface, and the contraction layer may include a second material having a second thermal expansion coefficient smaller than the first thermal expansion coefficient to offset the restoring force of the light guide plate.

Embodiments of the inventive concept provide a display device including a display panel, a backlight unit disposed below the display panel to provide a light to the display panel, and a bottom chassis which is disposed below the backlight unit, accommodates the backlight unit, and is curved along a first direction. A plurality of grooves is defined in an upper or lower surface of the bottom chassis and the grooves are arranged in the first direction.

In an embodiment, each of the grooves may extend substantially parallel to a second direction different from the first direction.

According to embodiments described herein, the restoring force occurring in the curved light guide plate may be reduced. In such embodiments, the thickness of the curved display device may be reduced.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1A:
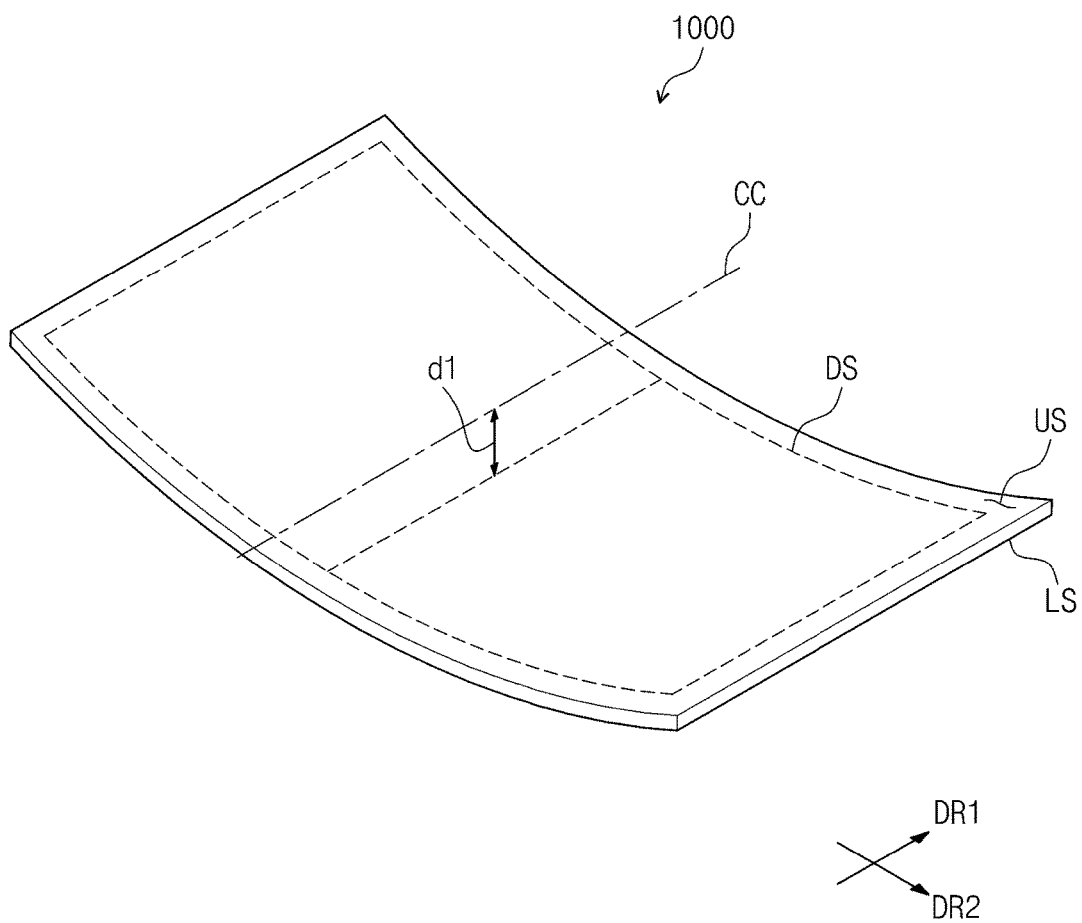
FIG. 1A is a perspective view showing a display device according to an exemplary embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure.

Like numbers refer to like elements throughout. In the drawings, the thickness of layers, films, and regions are exaggerated for clarity. The use of the terms first, second, etc. do not denote any order or importance, but rather the terms first, second, etc. are used to distinguish one element from another. It will be understood that when an element such as a layer, film, region, or substrate is referred to as being "on" another element, it can be directly on the other element or intervening elements may also be present.

The terminology used herein is for the purpose of describing particular embodiments only and is not intended to be limiting of the invention. As used herein, the singular forms, "a", "an" and "the" are intended to include the plural forms as well, unless the context clearly indicates otherwise. Or"

means "and/or." As used herein, the term "and/or" includes any and all combinations of one or more of the associated listed items.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

Figure 1B:
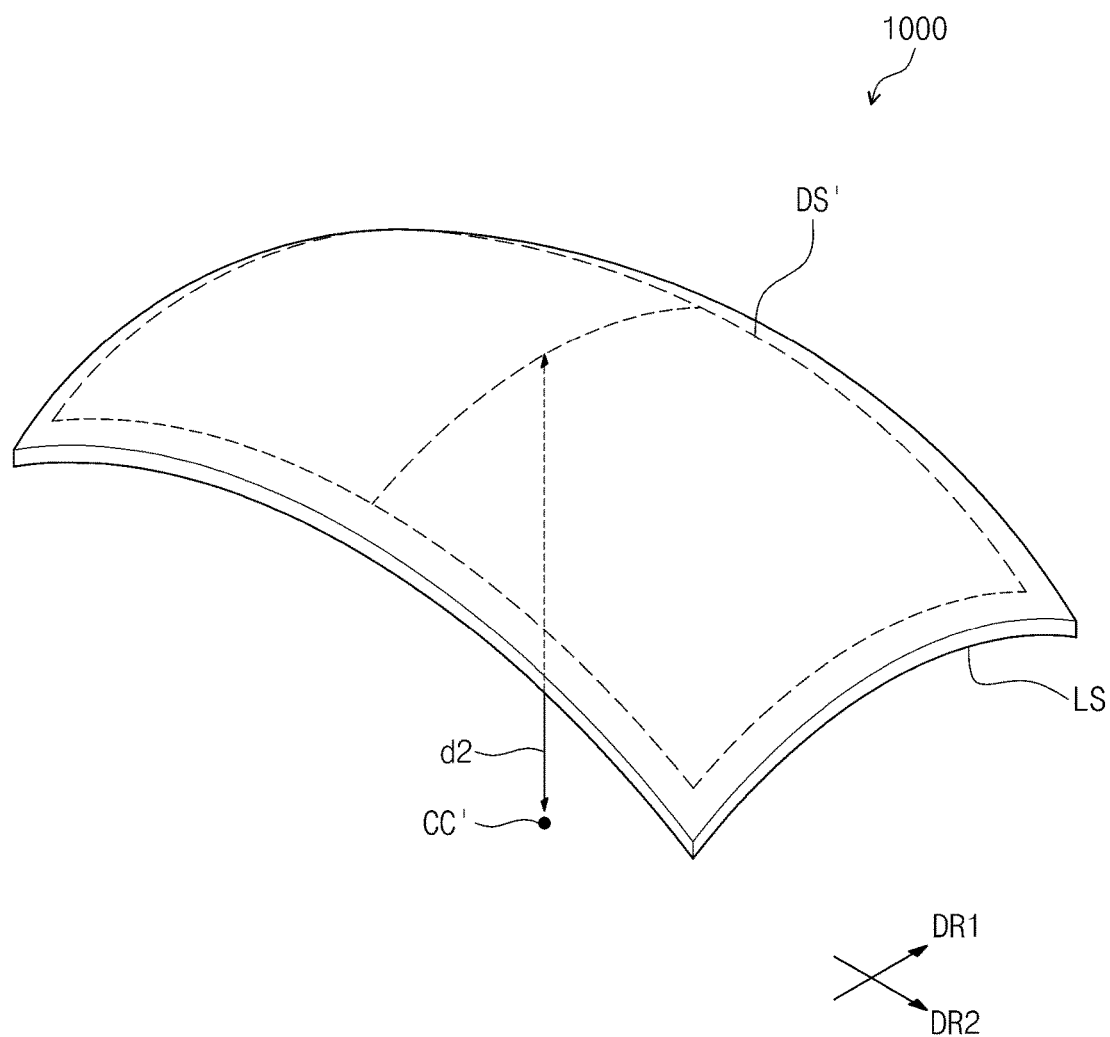
FIG. 1B is a perspective view showing a display device according to an alternative exemplary embodiment of the disclosure.

FIG. 1A is a perspective view showing a display device 1000 according to an exemplary embodiment of the disclosure, and FIG. 1B is a perspective view showing a display device 1000 according to an alternative exemplary embodiment of the disclosure.

Referring to FIG. 1A, an exemplary embodiment of the display device 1000 has a curved shape. In such an embodiment, where the display device 1000 has the curved shape, a display surface DS of the display device 1000 has a curved surface shape. An image having improved three-dimensional effect, sense of immersion (or immersiveness), and presence of the image may be displayed through the display surface DS having the curved shape.

In an exemplary embodiment, as shown in FIG. 1A, the display device DS may be concave curved. In such an embodiment, the display device 1000 may be curved to surround or about a center of curvature CC. In an exemplary embodiment, the center of curvature CC may be, but not limited to, an imaginary reference line or axis substantially parallel to a first direction DR1 and may be defined at a position spaced apart from an upper surface US of the display device 1000 by a predetermined distance d1. Accordingly, the display surface DS of the display device 1000 may have the curved shape bent along a second direction DR2 substantially vertical to the first direction DR1.

The upper surface US of the display device 1000 may be referred to as an inner circumferential surface of the display device 1000, and a lower surface LS of the display device 1000 may be referred to as an outer circumferential surface of the display device 1000.

The inner circumferential surface may be a surface facing the center of curvature CC and the outer circumferential surface may be a surface facing an opposite direction to the center of curvature CC. A distance between the inner circumferential surface and the center of curvature CC may be shorter than a distance between the outer circumferential surface and the center of curvature CC, and a curvature of the inner circumferential surface may be smaller than a curvature of the outer circumferential surface.

According to an alternative exemplary embodiment, as shown in FIG. 1B, the display device DS is convex curved. In such an embodiment, the display device 1000 may be curved to surround or about a center of curvature CC'. In an exemplary embodiment, the center of curvature CC' may be, but not limited to, an imaginary reference point or dot and may be defined at a position spaced apart from a lower surface LS of the display device 1000 by a predetermined distance d2. Accordingly, a display surface DS' of the display device 1000 may have a spherical shape bent along the second direction DR2 substantially vertical to the first direction DR1.

In an exemplary embodiment, the upper surface US of the display device 1000 may be referred to as the outer circumferential surface of the display device 1000 and the lower surface LS of the display device 1000 may be referred to as the inner circumferential surface of the display device 1000.

However, the curved shape of an exemplary embodiment of the display device 1000 should not be limited to those shown in FIGS. 1A and 1B.

Referring back to FIG. 1A, in an exemplary embodiment, where the display device 1000 has the curved shape, components included in the display device 1000 may be curved along the second direction DR2. Hereinafter, the outer and inner circumferential surfaces may be defined on the components included in the display device 1000 similar to the above-mentioned structure.

Figure 2:
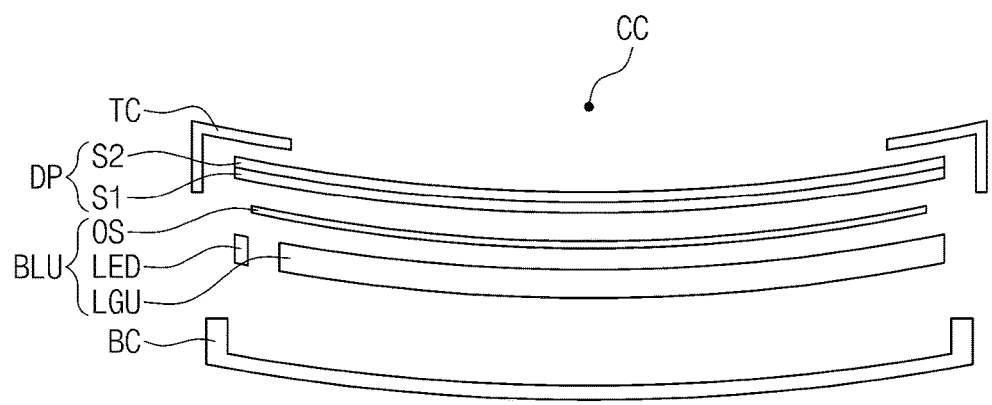
FIG. 2 is a schematic cross-sectional view showing the display device shown in FIG. 1A.

FIG. 2 is a schematic cross-sectional view showing the display device shown in FIG. 1A.

Referring to FIG. 2, an exemplary embodiment of the display device 1000 includes a display panel DP, a backlight unit BLU, a top chassis TC, and a bottom chassis BC. The display panel DP, the backlight unit BLU, the top chassis TC, and the bottom chassis BC are curved to surround or about the center of curvature CC as described above.

In such an embodiment, the display panel DP includes a lower substrate S1 and an upper substrate S2 facing the lower substrate S1. In an exemplary embodiment, the display panel DP may be a liquid crystal display panel. According to an alternative exemplary embodiment, the display panel DP may be a flat panel display, such as an organic light emitting display panel. In such an embodiment, where the display panel DP is the organic light emitting display panel, the backlight unit BLU may be omitted and the display panel DP may include an organic light emitting layer.

Although not shown in figures, the display panel DP includes a plurality of pixels and gate and data lines connected to the pixels. In one exemplary embodiment, for example, the pixels may include a liquid crystal layer.

The lower substrate S1 includes a pixel electrode of each of the pixels and a pixel circuit for driving the pixel electrode. The upper substrate S2 faces the lower substrate S1. The lower substrate S1 and the upper substrate S2 may be a glass substrate including or formed of glass or a flexible substrate including or formed of polymer.

The backlight unit BLU is disposed below the display panel DP. The backlight unit BLU includes an optical sheet OS, a light guide unit LGU, and a light source LED. The light source LED may include a light emitting diode. The light emitting diode emits a white light and is disposed or mounted on a printed circuit board (not shown). The light source LED is disposed at a side portion or surface of the light guide unit LGU and provides the light guide unit LGU with the white light.

The light guide unit LGU converts the white light incident thereto to a surface light source and provides the surface light source to a rear surface of the display panel DP. The light guide unit LGU will be described in greater detail later.

The optical sheet OS is disposed between the light guide unit LGU and the display panel DP and includes at least one sheet to improve brightness characteristics of the surface light source exiting from the light guide unit LGU. In one exemplary embodiment, for example, the optical sheet OS includes one diffusion sheet (not shown) to diffuse the surface light source and two condensing sheets (or prism sheet, not shown) to condense the surface light source.

In an exemplary embodiment, the bottom chassis BC is disposed below the backlight unit BLU. The bottom chassis BC accommodates the backlight unit BLU therein. In such an embodiment, the bottom chassis BC may accommodate the display panel DP therein.

The top chassis TC is disposed above the display panel DP and coupled to the bottom chassis BC to hold the display panel DP. The top chassis TC protects the display panel DP and the backlight unit BLU from external impacts in cooperation with the bottom chassis BC.

Although not shown in figures, an exemplary embodiment of the display device 1000 may further include a mold frame. The mold frame is interposed between the display panel DP and the backlight unit BLU to fix the backlight unit BLU to the bottom chassis, and supports the display panel DP.

In an exemplary embodiment, the display panel DP may be curved to surround or about the center of curvature CC. Therefore, an upper surface of the display panel DP may be referred to as the inner circumferential surface of the display panel DP, and the lower surface LS of the display device 1000 may be referred to as the outer circumferential surface of the display device 1000.

Figure 3:
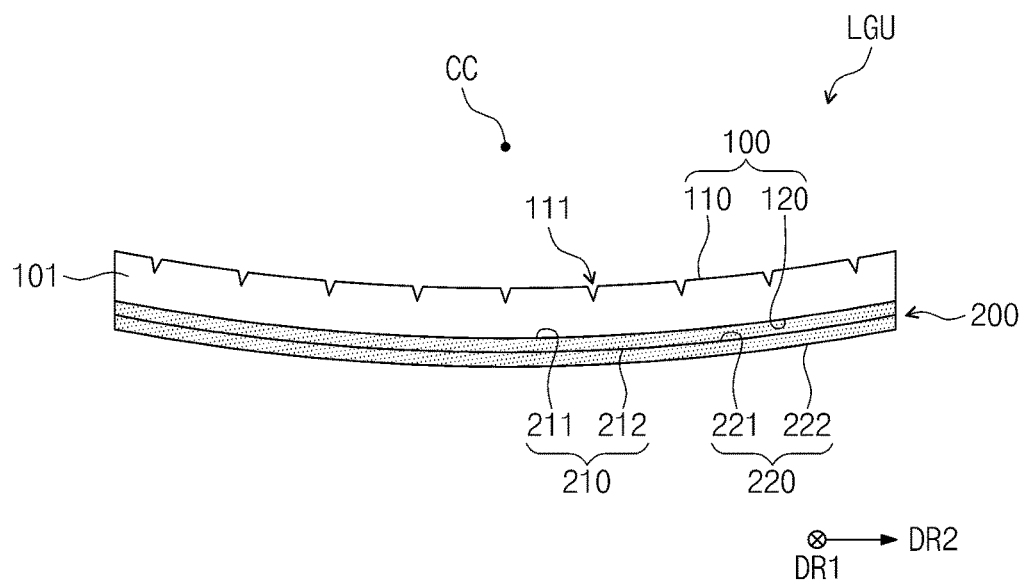
FIG. 3 is an enlarged cross-sectional view showing a light guide unit shown in FIG. 2.

FIG. 3 is an enlarged cross-sectional view showing the light guide unit LGU shown in FIG. 2.

Referring to FIG. 3, the light guide unit LGU includes a light guide plate 100 and a restoring force-offset layer. In an exemplary embodiment, the restoring force-offset layer includes an expansion layer 200.

In an exemplary embodiment, the light guide plate 100 has a curved shape. In such an embodiment, the light guide plate 100 is curved to surround or about the center of curvature CC and bent along the second direction DR2. The light guide plate 100 includes a first inner circumferential surface 110 and a first outer circumferential surface 120. A distance between the first inner circumferential surface 110 and the center of curvature CC is shorter than a distance between the first outer circumferential surface 120 and the center of curvature CC. In such an embodiment, the first inner circumferential surface 110 is a surface facing the center of curvature CC, and the first outer circumferential surface 120 is a surface facing an opposite direction to the center of curvature CC.

The light guide plate 100 receives the white light through a light incident surface 101. The light guide plate 100 guides the white light to the second direction DR2 through a total reflection and converts the white light to the surface light source to allow the surface light source to exit through the first inner circumferential surface 110.

In an exemplary embodiment, the first inner circumferential surface 110 may include a plurality of first grooves 111 defined therein. The first grooves 111 are recessed from the first inner circumferential surface 110 to the first outer circumferential surface 120. In an exemplary embodiment, the first grooves 111 are arranged in the second direction DR2. The first grooves 111 are spaced apart from each other in the second direction DR2 at regular intervals. In such an embodiment, the first grooves 111 extend in the first direction DR1 to be substantially parallel to each other, and the first grooves 111 are arranged in a one-dimensional grating shape or pattern. In an alternative exemplary embodiment, the first grooves 111 may be omitted.

The light guide plate 100 includes a first material having a first thermal expansion coefficient.

The first material is flexible or has a flexibility. In an exemplary embodiment, the light guide plate 100 has a flat shape in an initial state. The light guide plate 100 has the curved shape by bending the light guide plate in the initial state. In such an embodiment, where the light guide plate 100 is curved, a restoring force occurs in the light guide plate 100. The restoring force allows the light guide plate 100 to have the flat shape. The restoring force may be reduced by the first grooves 111.

The expansion layer 200 includes a first expansion layer 210 and a second expansion layer 220. The first and second expansion layers 210 and 220 are arranged in order of the second expansion layer 220/the first expansion layer 210/the light guide plate 100, as shown in FIG. 3.

The first expansion layer 210 is coupled to the first outer circumferential surface 120. In an exemplary embodiment, the first expansion layer 210 has a thin film shape. The first expansion layer 210 may be, but not limited to, a film and may be attached to or coated on the first outer circumferential surface 120. In such an embodiment, the first expansion layer 210 may be extruded together with the light guide plate 100 through a co-extrusion process.

The first expansion layer 210 may include a second material having a second thermal expansion coefficient.

The first expansion layer 210 has a curved shape similar to the light guide plate 100. In such an embodiment, the first expansion layer 210 is curved to surround or about the center of curvature CC and curved along the second direction DR2. The first expansion layer 210 includes a second inner circumferential surface 211 and a second outer circumferential surface 212. A distance between the second inner circumferential surface 211 and the center of curvature CC is shorter than a distance between the second outer circumferential surface 212 and the center of curvature CC. In such an embodiment, the second inner circumferential surface 211 is a surface facing the center of curvature CC and the second outer circumferential surface 212 is a surface facing an opposite direction to the center of curvature CC.

The second expansion layer 220 is coupled to the second outer circumferential surface 212. In an exemplary embodiment, the second expansion layer 220 has a thin film shape. The second expansion layer 220 may be, but not limited to, a film and may be attached to or coated on the second outer circumferential surface 212. In such an embodiment, the second expansion layer 220 may be extruded together with the light guide plate 100 and the first expansion layer 210 through the co-extrusion process.

The second expansion layer 220 may include a third material having a third thermal expansion coefficient.

The second expansion layer 220 has a curved shape similar to the light guide plate 100. In such an embodiment, the second expansion layer 220 is curved to surround or about the center of curvature CC and curved along the second direction DR2. The second expansion layer 220 includes a third inner circumferential surface 221 and a third outer circumferential surface 222. A distance between the third inner circumferential surface 221 and the center of curvature CC is shorter than a distance between the third outer circumferential surface 222 and the center of curvature CC. In such an embodiment, the third inner circumferential surface 221 is a surface facing the center of curvature CC and the third outer circumferential surface 222 is a surface facing an opposite direction to the center of curvature CC.

The first and second expansion layers 210 and 220 may offset the restoring force of the light guide plate 100. In an exemplary embodiment, the first, second and third thermal expansion coefficients satisfy the following Inequation 1.

$$a1<a2<a3 \qquad \text{Inequation 1}$$

In Inequation 1, a1, a2, and a3 denote the first, second, and third thermal expansion coefficients, respectively. According to an alternative exemplary embodiment, the first, second and third thermal expansion coefficients satisfy the following Inequation 2.

$$a1<a3<a2 \qquad \text{Inequation 2}$$

The first to third materials may include at least one of a transparent polymer resin and a glass material. The polymer resin may include at least one of polyester, such as polyethylene terephthalate, polybutylene phthalate, polyethylene naphthalate, etc., polystyrene, polycarbonate, polyether sulfone, polyarylate, polyimide, polycycloolefin, norbornen resin, poly(chlorotrifluoroethylene), and polymethyl methacrylate.

In an exemplary embodiment, the first material may be, but not limited to, polycarbonate, and the second material may be, but not limited to, polyarylate.

In an exemplary embodiment, where the second and third thermal expansion coefficients are greater than the first thermal expansion coefficient, a combination of the first, second, and third materials may be formed in various ways.

In an exemplary embodiment, as described above, where the first and second expansion layers 210 and 220 include the material having the thermal expansion coefficient greater than that of the light guide plate 100, the first and second expansion layers 210 and 220 tend to be more expanded than the light guide plate 100 in accordance with an ambient temperature. As a result, the first and second expansion layers 210 and 220 may apply an offset force to the first outer circumferential surface 120 of the light guide plate 100. The offset force allows the light guide plate 100 to be curved and to surround or about the center of curvature CC and offsets the restoring force.

In such an embodiment, since the restoring force is offset, separate components, e.g., a frame coupled to the bottom chassis to maintain the curved shape of the light guide plate, may be omitted, and thus a thickness of the display device 1000 (refer to FIG. 2) may be reduced and a manufacturing cost of the display device 1000 may be reduced.

FIG. 3 shows an exemplary embodiment where the expansion layer 200 includes the second expansion layer 220, but not being limited thereto. In an alternative exemplary embodiment, the second expansion layer 220 may be omitted. In an exemplary embodiment, the expansion layer 200 may further include third and fourth expansion layers 200 each having a thermal expansion coefficient different from the first thermal expansion coefficient.

Figure 4:
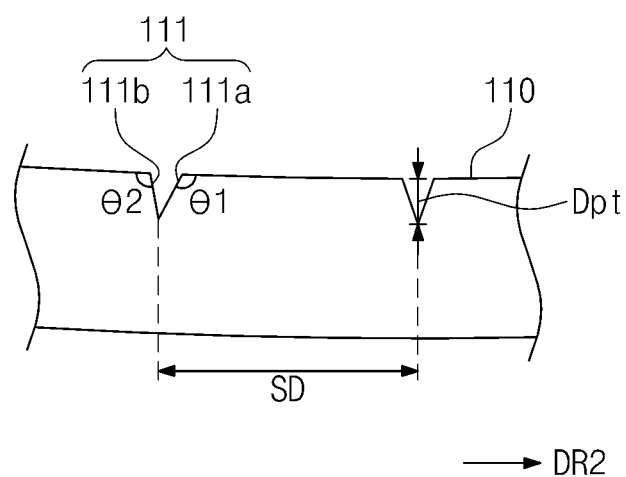
FIG. 4 is an enlarged cross-sectional view showing the light guide unit shown in FIG. 3.

FIG. 4 is an enlarged cross-sectional view showing the light guide unit LGU shown in FIG. 3.

Referring to FIG. 4, in an exemplary embodiment, each of the first grooves 111 includes a first inclination surface 111a and a second inclination surface 111b. The first inclination surface 111a is inclined at a first angle θ1 with respect to the first inner circumferential surface 110 and the second inclination surface 111b is inclined at a second angle θ2 with respect to the first inner circumferential surface 110. In an exemplary embodiment, the first angle θ1 may be substantially the same as the second angle θ2.

One ends of the first and second inclination surfaces 111a and 111b are connected to each other, and the other ends of the first and second inclination surfaces 111a and 111b are connected to the first inner circumferential surface 110.

In one exemplary embodiment, for example, each of the first and second angles θ1 and θ2 may be about 135 degrees, and an included angle between the first and second inclination surfaces 111a and 111b may be about 90 degrees. In an alternative exemplary embodiment, each of the first and second angles θ1 and θ2 may be about 111.5 degrees, and an included angle between the first and second inclination surfaces 111a and 111b may be about 45 degrees.

The first grooves 111 are spaced apart from each other by an interval SD in the second direction DR2. The interval SD is in a range from about 2 millimeters (mm) to about 5 mm. In such an embodiment, as the interval SD decreases, the restoring force may be effectively offset. In such an embodiment, each first groove 111 has a depth Dpt in a range from about 0.25 mm to about 2 mm.

Figure 5:
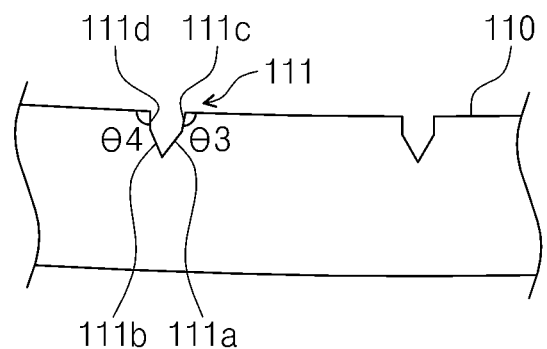
FIG. 5 is an enlarged cross-sectional view showing a light guide unit according to another exemplary embodiment of the disclosure.

FIG. 5 is an enlarged cross-sectional view showing a light guide unit according to another exemplary embodiment of the disclosure.

Referring to FIG. 5, each of the first grooves 111 may further include a third inclination surface 111c and a fourth inclination surface 111d. The third inclination surface 111c is inclined at a third angle θ3 with respect to the first inner circumferential surface 110 and the fourth inclination surface 111d is inclined at a fourth angle θ4 with respect to the first inner circumferential surface 110. In an exemplary embodiment, the third angle θ3 may be substantially the same as the fourth angle θ4.

One ends of the third and fourth inclination surfaces 111c and 111d are respectively connected to the other ends of the first and second inclination surfaces 111a and 111b, and the other ends of the third and fourth inclination surfaces 111c and 111d are connected to the first inner circumferential surface 110.

Figure 6:
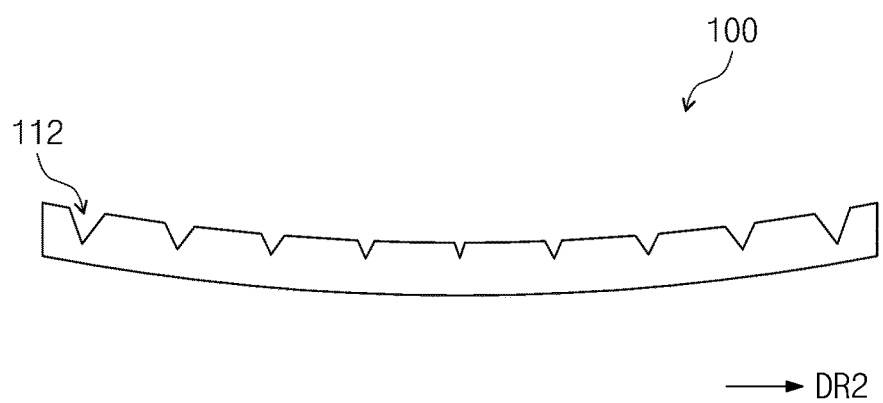
FIG. 6 is an enlarged cross-sectional view showing a light guide unit according to an alternative exemplary embodiment of the disclosure.

FIG. 6 is an enlarged cross-sectional view showing a light guide unit according to an alternative exemplary embodiment of the disclosure.

Referring to FIG. 6, in an exemplary embodiment, the light guide plate 100 includes a plurality of first grooves 112. Among the first grooves 112, at least one first groove has a depth different from that of the other first grooves.

In an exemplary embodiment, the depth of the first grooves 112 becomes greater as a distance thereof from a center of the light guide plate 100 increases. In such an embodiment, the depth of the first grooves 112 may gradually become great along second direction DR2 and a direction opposite to the second direction DR2 from the center of the light guide plate 100.

The restoring force occurring at a point in the light guide plate 100 gradually becomes great as a distance of the point from the center of the light guide plate 100 increases and a distance of the point from edges of the light guide plate 100 decreases. Thus, the depth of the first grooves 112 is determined depending on or corresponding to a level of the restoring force, so that the restoring force may be effectively offset.

Figure 7:
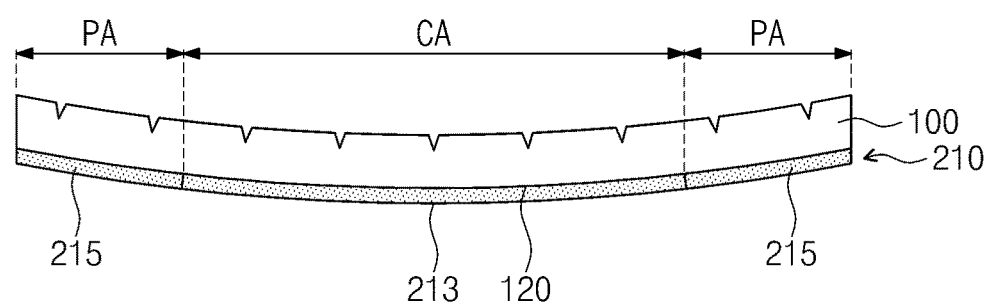
FIG. 7 is a cross-sectional view showing a light guide unit according to another alternative exemplary embodiment of the disclosure.

FIG. 7 is a cross-sectional view showing a light guide unit according to another alternative exemplary embodiment of the disclosure.

Referring to FIG. 7, in an exemplary embodiment, the first expansion layer 210 includes a first sub-expansion layer 213 and a second sub-expansion layer 215.

The first sub-expansion layer 213 is disposed corresponding to a center portion (e.g., a center area CA) of the light guide plate 100 and the second sub-expansion layer 215 is disposed corresponding to an edge portion (e.g., a peripheral arear) of the light guide plate 100.

In such an embodiment, the center area CA and the peripheral area PA of the light guide plate 100 may be defined respectively corresponding to the center and edge portions or areas of the light guide plate 100. The center area CA is interposed between the peripheral areas PA defined at side portions of the light guide plate 100. The first and second sub-expansion layers 213 and 215 are coupled to the first outer circumferential surface 120 of the light guide plate 100 to respectively correspond to the center area CA and the peripheral area PA.

The first sub-expansion layer 213 has a thermal expansion coefficient different from that of the second sub-expansion layer 215. In an exemplary embodiment, the thermal expansion coefficient of the first sub-expansion layer 213 is greater than the first thermal expansion coefficient and smaller than the thermal expansion coefficient of the second sub-expansion layer 215.

In such an embodiment, as described above, the restoring force occurring in the light guide plate 100 gradually becomes great as a distance from the center of the light guide plate 100 increases and a distance from edges of the light guide plate 100 decreases. Accordingly, the thermal expansion coefficients of the first and second sub-expansion layers 213 and 215 are determined depending on or corresponding to the level of the restoring force, and thus the restoring force may be effectively offset.

Figure 8:
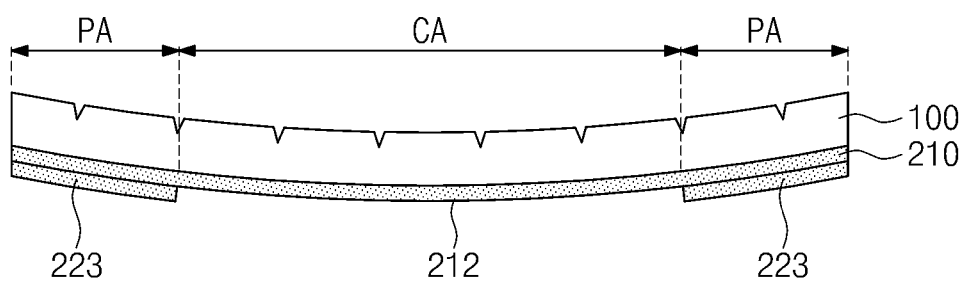
FIG. 8 is a cross-sectional view showing a light guide unit according to another alternative exemplary embodiment of the disclosure.

FIG. 8 is a cross-sectional view showing a light guide unit according to another alternative exemplary embodiment of the disclosure.

Referring to FIG. 8, in an exemplary embodiment, the first expansion layer 210 is coupled to the outer circumferential surface 120 to correspond to the center area CA and the peripheral areas PA.

In such an embodiment, the second expansion layer 223 is coupled to a portion of the second outer circumferential surface 212 of the first expansion layer 210 corresponding to the peripheral area PA, and the second expansion layer 223 is not provided on a portion of the second outer circumferential surface 212 of the first expansion layer 210 in the center area CA. In such an embodiment, the second expansion layer 223 does not overlap the center of the light guide plate 100 in a vertical direction.

In such an embodiment, as described above, the restoring force occurring in the light guide plate 100 gradually becomes great as a distance from the center of the light guide plate 100 increases and a distance from edges of the light guide plate 100 decreases. Accordingly, in such an embodiment, where the first and second sub-expansion layers 210 and 223 are disposed corresponding to the center and edges of the light guide plate 100, the restoring force may be effectively offset.

Figure 9:
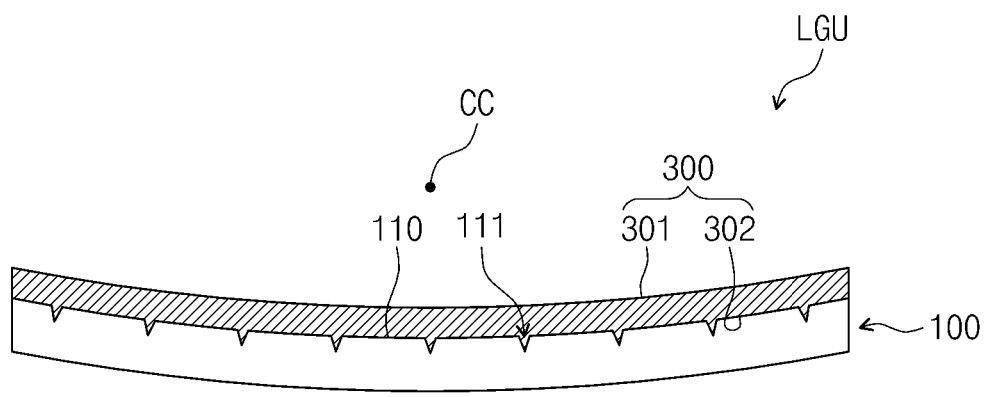
FIG. 9 is a cross-sectional view showing a light guide unit according to another alternative exemplary embodiment of the disclosure.

FIG. 9 is a cross-sectional view showing a light guide unit according to another alternative exemplary embodiment of the disclosure.

Referring to FIG. 9, in an exemplary embodiment, the light guide unit LGU includes the light guide plate 100 and a restoring force-offset layer. In an exemplary embodiment, as shown in FIG. 9, the restoring force-offset layer includes a contraction layer 300.

The contraction layer 300 is coupled to the first inner circumferential surface 110. In an exemplary embodiment, the contraction layer 300 has a thin film shape. The contraction layer 300 may be, but not limited to, a film, and may be attached to or coated on the first inner circumferential surface 110. In an exemplary embodiment, the contraction layer 300 may be extruded together with the light guide plate 100 through the co-extrusion process.

The contraction layer 300 may include a fourth material having a fourth thermal expansion coefficient.

In an exemplary embodiment, the contraction layer 300 has a curved shape similar to the light guide plate 100. In such an embodiment, the contraction layer 300 is curved to surround or about the center of curvature CC, and curved along the second direction DR2. The contraction layer 300 includes a fourth inner circumferential surface 301 and a fourth outer circumferential surface 302. A distance between the fourth inner circumferential surface 301 and the center of curvature CC is shorter than a distance between the fourth outer circumferential surface 302 and the center of curvature CC. In such an embodiment, the fourth inner circumferential surface 301 is a surface facing the center of curvature CC, and the fourth outer circumferential surface 302 is a surface facing an opposite direction to the center of curvature CC.

In an exemplary embodiment, the contraction layer 300 is coupled to the first inner circumferential surface 110 to fill the first grooves 111. The fourth inner circumferential surface 301 is substantially parallel to the first inner circumferential surface 110. According to an alternative embodiment, the first grooves 111 may be omitted, and thus a total surface of the fourth outer circumferential surface 302 of the contraction layer 300 makes contact with the first inner circumferential surface 110

The contraction layer 300 may offset the restoring force. In an exemplary embodiment, the first and fourth thermal expansion coefficients satisfy the following Inequation 3.

$$a4<a1 \qquad \text{Inequation 3}$$

In Inequation 3, a4 denotes the fourth thermal expansion coefficient.

The fourth material may include at least one of a transparent polymer resin and a glass material. The polymer resin may include at least one of polyester, such as polyethylene terephthalate, polybutylene phthalate, polyethylene naphthalate, etc., polystyrene, polycarbonate, polyether sulfone, polyarylate, polyimide, polycycloolefin, norbornen resin, poly(chlorotrifluoroethylene), and polymethyl methacrylate.

In an exemplary embodiment where the fourth thermal expansion coefficient is smaller than the first thermal expansion coefficient, a combination of the first and fourth materials may be formed in various ways.

In such an embodiment, as described above, since contraction layer 300 includes the material having the thermal expansion coefficient smaller than that of the light guide plate 100, the contraction layers 300 tend to be more contracted than the light guide plate 100 in accordance with the ambient temperature. As a result, the contraction layer 300 may apply the offset force to the first inner circumferential surface 110 of the light guide plate 100. The offset force allows the light guide plate 100 to be curved and to surround or about the center of curvature CC and offsets the restoring force.

In such an embodiment, the restoring force is offset as described above, such that separate components, e.g., a frame coupled to the bottom chassis to maintain the curved shape of the light guide plate, may be omitted, and thus a thickness of the display device 1000 (refer to FIG. 2) may be reduced and a manufacturing cost of the display device 1000 may be reduced.

Although not shown in FIG. 9, such an embodiment of the light guide unit LGU may further include the expansion layer 200 described above with reference to FIG. 3.

Figure 10:
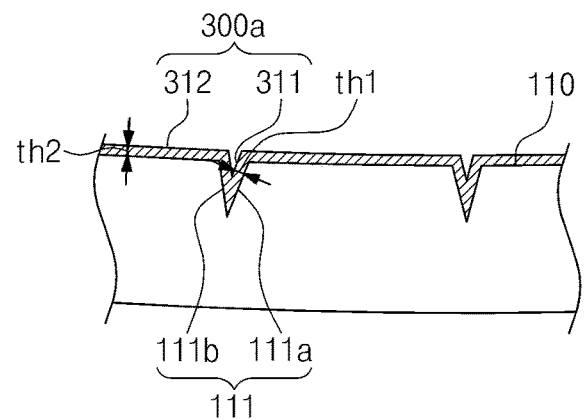
FIG. 10 is a cross-sectional view showing a light guide unit according to another alternative exemplary embodiment of the disclosure.

FIG. 10 is a cross-sectional view showing a light guide unit according to another alternative exemplary embodiment of the disclosure.

Referring to FIG. 10, in an exemplary embodiment, a contraction layer 300a includes a first sub-contraction layer 311 and a second sub-contraction layer 312. The first sub-contraction layer 311 is disposed corresponding to the first grooves 111 and covers the first grooves 111. The second sub-contraction layer 312 is disposed corresponding to the first inner circumferential surface 110 and covers the first inner circumferential surface 110.

The first and second sub-contraction layers 311 and 312 extend to each other to be connected to each other.

The first sub-contraction layer 311 has a first thickness th1 and the second sub-contraction layer 312 has a second thickness th2. In an exemplary embodiment, the first thickness th1 may be substantially the same as the second thickness th2.

An upper surface of the first sub-contraction layer 311 is substantially parallel to the first and second inclination surfaces 111a and 111b, and an upper surface of the second sub-contraction layer 312 is substantially parallel to the first inner circumferential surface 110.

Figure 11:
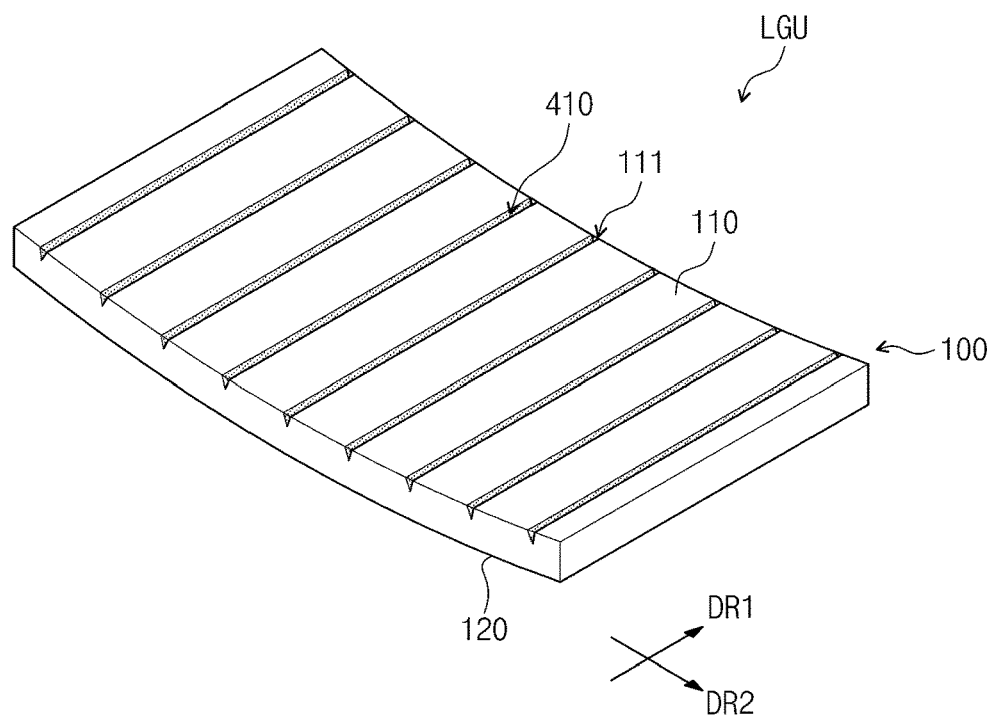
FIG. 11 is a cross-sectional view showing a light guide unit according to another alternative exemplary embodiment of the disclosure.

FIG. 11 is a cross-sectional view showing a light guide unit according to another alternative exemplary embodiment of the disclosure.

Referring to FIG. 11, in an exemplary embodiment, the light guide unit LGU includes the light guide plate 100 and a restoring force-offset member 410.

In such an embodiment, as described above, the first grooves 111 are defined or formed in the first inner circumferential surface 110 of the light guide plate 100.

The restoring force-offset member 410 is provided in a plural number. The restoring force-offset members 410 extend in the first direction DR1 and are arranged spaced apart from each other by a predetermined interval in the second direction DR2.

In an exemplary embodiment, the restoring force-offset members 410 are provided respectively corresponding to the first grooves 111. Each of the restoring force-offset members 410 has an inverted triangular shape in a cross-section, which corresponds to a cross-sectional shape of the first grooves 111, and has a triangular prism shape extending in the first direction DR1.

In one exemplary embodiment, for example, the first grooves 111 may be filled with the restoring force-offset members 410. A step difference does not exist between the first inner circumferential surface 110 and the restoring force-offset member 410 in the vertical direction, and a distance between the first outer circumferential surface 120 and the first inner circumferential surface 110 may be substantially the same as a distance between the first outer circumferential surface 120 and an upper surface of the restoring force-offset members 410.

In one alternative exemplary embodiment, for example, the distance between the first outer circumferential surface 120 and the first inner circumferential surface 110 may be different from the distance between the first outer circumferential surface 120 and the upper surface of the restoring force-offset members 410.

In such an embodiment, the restoring force-offset members 410 may include the fourth material.

Each of the restoring force-offset members 410 may be attached to a corresponding first groove 111 of the first grooves 111. In such an embodiment, as described above, since the restoring force-offset member 410 includes the material having the thermal expansion coefficient smaller than that of the light guide plate 100, the restoring force-offset member 410 tends to be more contracted than the light guide plate 100 in accordance with the ambient temperature. As a result, the restoring force-offset member 410 may apply the offset force to the light guide plate 100 through the first grooves 111. The offset force allows the light guide plate 100 to be curved and to surround or about the center of curvature CC and offsets the restoring force.

Figure 12:
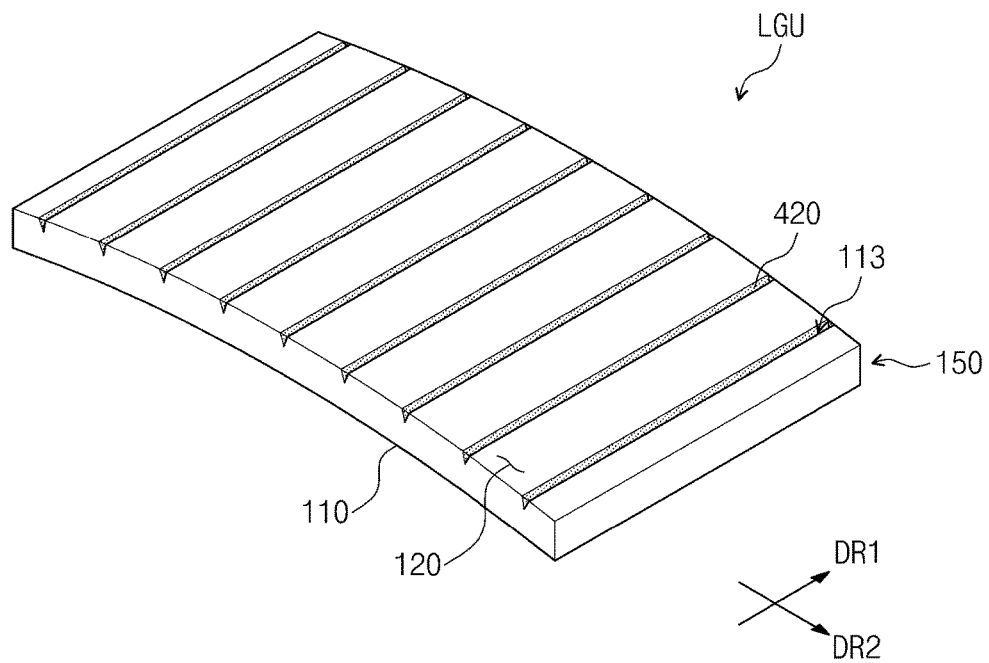
FIG. 12 is a cross-sectional view showing a light guide unit according to another alternative exemplary embodiment of the disclosure.

FIG. 12 is a cross-sectional view showing a light guide unit according to another alternative exemplary embodiment of the disclosure.

Referring to FIG. 12, in an exemplary embodiment, the light guide unit LGU includes a light guide plate 150 and a restoring force-offset member 420.

In an exemplary embodiment, a plurality of second grooves 113 is defined or formed in the first outer circumferential surface 120 of the light guide plate 150. The second grooves 113 have the same structure and function as those of the first grooves 111 except that the second grooves 113 are defined or formed in the first outer circumferential surface 120, and any repetitive detailed description thereof will be omitted. The second grooves 113 are recessed to the first inner circumferential surface 110 from the first outer circumferential surface 120.

The restoring force-offset member 420 is provided in a plural number. The restoring force-offset members 420 extend in the first direction DR1 and are arranged spaced apart from each other by a predetermined interval in the second direction DR2.

In an exemplary embodiment, the restoring force-offset members 420 are respectively coupled to the second grooves 113. Each of the restoring force-offset members 420 has an inverted triangular shape in a cross-section, which corresponds to a cross-sectional shape of the second grooves 113, and has a triangular prism shape extending in the first direction DR1.

In one exemplary embodiment, for example, the second grooves 113 may be filled with the restoring force-offset members 420. A step difference does not exist between the first outer circumferential surface 120 and the restoring force-offset members 420 in the vertical direction, and a distance between the first inner circumferential surface 110 and the first outer circumferential surface 120 may be substantially the same as a distance between the first inner circumferential surface 110 and an upper surface of the restoring force-offset members 420.

In one alternative exemplary embodiment, for example, the distance between the first inner circumferential surface 110 and the first outer circumferential surface 120 may be different from the distance between the first inner circumferential surface 110 and the upper surface of the restoring force-offset members 420.

The restoring force-offset members 420 may include the second material.

Each of the restoring force-offset members 420 may be fixed to a corresponding second groove 113 of the second grooves 113. In such an embodiment, as described above, since the restoring force-offset member 420 includes the material having the thermal expansion coefficient greater than that of the light guide plate 100, the restoring force-offset member 420 tends to be more expanded than the light guide plate 100 in accordance with the ambient temperature. As a result, the restoring force-offset member 420 may apply the offset force to the light guide plate 100 through the second grooves 113. The offset force allows the light guide plate 100 to be curved and to surround or about the center of curvature CC and offsets the restoring force.

Figure 13:
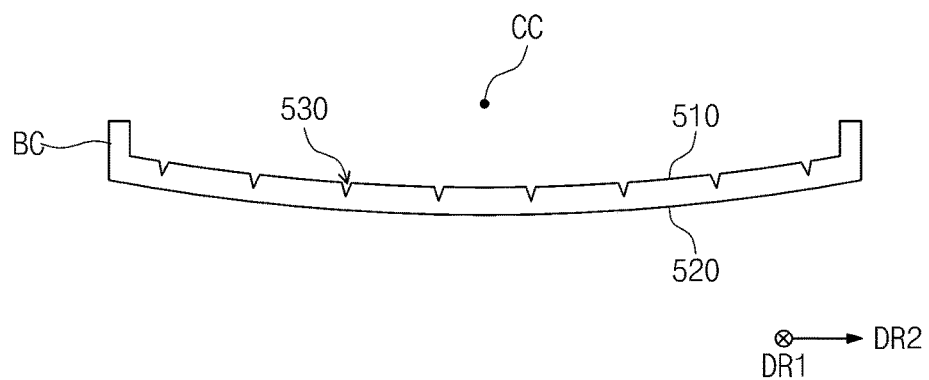
FIG. 13 is an enlarged cross-sectional view showing a bottom chassis shown in FIG. 2.

FIG. 13 is an enlarged cross-sectional view showing the bottom chassis BC shown in FIG. 2.

Referring to FIG. 13, the bottom chassis BC has the curved shape. In an exemplary embodiment, the bottom chassis BC is curved to surround or about the center of curvature CC and bent along the second direction. The bottom chassis BC includes a fifth inner circumferential surface 510 and a fifth outer circumferential surface 520. A distance between the fifth inner circumferential surface 510 and the center of curvature CC is shorter than a distance between the fifth outer circumferential surface 520 and the center of curvature CC. In such an embodiment, the fifth inner circumferential surface 510 is a surface facing the center of curvature CC and the fifth outer circumferential surface 520 is a surface facing an opposite direction to the center of curvature CC. In an exemplary embodiment, the fifth inner circumferential surface 510 and the fifth outer circumferential surface 520 may be indicated as upper and lower surfaces of the bottom chassis BC, respectively.

In an exemplary embodiment, a plurality of third grooves 530 is defined or formed in the fifth inner circumferential surface 530. The third grooves 530 are recessed to the fifth outer circumferential surface 520 from the fifth inner circumferential surface 510. In an exemplary embodiment, the third grooves 530 are arranged along the second direction DR2. The third grooves 530 are spaced apart from each other by a predetermined interval in the second direction DR2. In such an embodiment, each of the third grooves 530 extends substantially parallel to the first direction DR1, and the third grooves 530 are arranged in a one-dimensional grating.

The third grooves 113 have substantially the same shape as that of the first grooves 111 described with reference to FIG. 4, and thus any repetitive detailed description thereof will be omitted.

In such an embodiment, the bottom chassis BC is resistant to impacts applied thereto and has a thermal conductivity and a flexibility. The bottom chassis BC may include a metallic material, e.g., aluminum, iron, zinc, etc. In an exemplary embodiment, the bottom chassis BC having the curved shape may be obtained by bending the bottom chassis BC having the flat shape. In such an embodiment, since the bottom chassis BC is curved, the restoring force occurs in the bottom chassis BC. The restoring force allows the bottom chassis BC to have the flat shape. The restoring force may be reduced by the third grooves 530.

Although some exemplary embodiments of the invention have been described herein, it is understood that the invention should not be limited to these exemplary embodiments but various changes and modifications can be made by one ordinary skilled in the art within the spirit and scope of the invention as hereinafter claimed.

What is claimed is:

1. A light guide unit comprising:
    a light guide plate comprising a first material having a first thermal expansion coefficient, wherein the light guide plate is curved about a center of curvature, and is defined by a first outer circumferential surface and a first inner circumferential surface disposed closer to the center of curvature than the first outer circumferential surface; and
    a restoring force-offset layer attached to at least a substantial portion defining at least one of the first outer circumferential surface and the first inner circumferential surface and comprising a material having a thermal expansion coefficient different from the first thermal expansion coefficient.

2. The light guide unit of claim 1, wherein
    the restoring force-offset layer comprises a first expansion layer attached to the first outer circumferential surface, wherein the first expansion layer comprises a second material having a second thermal expansion coefficient greater than the first thermal expansion coefficient.

3. The light guide unit of claim 2, wherein a groove is defined in the first inner circumferential surface and recessed to the first outer circumferential surface.

4. The light guide unit of claim 3, wherein
    the light guide plate is curved along a first direction,
    the groove is provided in a plural number and arranged along the first direction, and
    each of the grooves extends substantially parallel to a second direction different from the first direction.

5. The light guide unit of claim 4, wherein
    each of the grooves includes:
    a first inclination surface inclined at a first angle with respect to the first inner circumferential surface; and
    a second inclination surface inclined at a second angle with respect to the first inner circumferential surface, and
    an end of the first inclination surface is connected to an end of the second inclination surface.

6. The light guide unit of claim 4, wherein the grooves have a depth becoming greater as a distance thereof from a center from the light guide plate increases and a distance thereof from an edge of the light guide plate decreases.

7. The light guide unit of claim 3, wherein the restoring force-offset layer further comprises a contraction layer attached to the first inner circumferential surface and comprising a third material having a third thermal expansion coefficient smaller than the first thermal expansion coefficient.

8. The light guide unit of claim 7, wherein the contraction layer comprises:
    a first sub-contraction layer disposed corresponding to the first inner circumferential surface; and
    a second sub-contraction layer disposed corresponding to the groove,
    wherein the first and second sub-contraction layers have a substantially same thickness as each other.

9. The light guide unit of claim 7, wherein
    the contraction layer is curved about the center of curvature,
    the contraction layer includes a second outer circumferential surface and a second inner circumferential disposed closer to the center of curvature than the second outer circumferential surface, the groove is filled with the contraction layer, and
the second inner circumferential surface is substantially parallel to the first inner circumferential surface.

10. The light guide unit of claim 2, wherein
the first expansion layer is curved about the center of curvature, and
the first expansion layer includes a second outer circumferential surface and a second inner circumferential disposed closer to the center of curvature than the second outer circumferential surface,
the restoring force-offset layer comprises a second expansion layer attached to the second outer circumferential surface, wherein the second expansion layer comprises a third material having a third thermal expansion coefficient greater than the second thermal expansion coefficient.

11. The light guide unit of claim 10, wherein
the first expansion layer is attached corresponding to a center portion of the light guide plate, and
the second expansion layer is attached corresponding to an edge portion of the light guide plate.

12. The light guide unit of claim 2, wherein the first expansion layer comprises:
a first sub-expansion layer attached corresponding to a center portion of the light guide plate; and
a second sub-expansion layer attached corresponding to an edge portion of the light guide plate,
wherein the first sub-expansion layer has a first sub-thermal expansion coefficient different from a second sub-thermal expansion coefficient of the second sub-expansion layer.

13. The light guide unit of claim 12, wherein
the first sub-thermal expansion coefficient of the first sub-expansion layer is greater than the first thermal expansion coefficient, and
the second sub-thermal expansion coefficient of the second sub-expansion layer is greater than the first sub-thermal expansion coefficient.

14. The light guide unit of claim 2, wherein a radius of curvature of the first inner circumferential surface is smaller than a second radius of curvature of the first outer circumferential surface.

15. The light guide unit of claim 1, wherein
the restoring force-offset layer further comprises a contraction layer attached to the first inner circumferential surface, wherein the contraction layer comprises a third material having a third thermal expansion coefficient smaller than the first thermal expansion coefficient.

16. A light guide unit comprising:
a light guide plate comprising a first material having a first thermal expansion coefficient, wherein the light guide plate is curved to surround a center of curvature, and includes an outer circumferential surface and an inner circumferential surface disposed closer to the center of curvature than the outer circumferential surface; and
a restoring force-offset member comprising a second material having a second thermal expansion coefficient different from the first thermal expansion coefficient,
wherein a groove is defined in at least one of the inner circumferential surface and the outer circumferential surface, and
the restoring force-offset member is attached to the groove.

17. The light guide unit of claim 16, wherein at least a portion of the groove is filled with the restoring force-offset member.

18. The light guide unit of claim 16, wherein
the groove is defined in the inner circumference surface, and
the second thermal expansion coefficient is smaller than the first thermal expansion coefficient.

19. The light guide unit of claim 16, wherein
the groove is defined in the outer circumference surface, and
the second thermal expansion coefficient is greater than the first thermal expansion coefficient.

20. A display device comprising:
a display panel; and
a backlight unit disposed below the display panel to provide a light to the display panel,
wherein the backlight unit comprises:
a light guide plate comprising a first material having a first thermal expansion coefficient, wherein the light guide plate is curved to surround a center of curvature, and is defined by an outer circumferential surface and an inner circumferential surface disposed closer to the center of curvature than the outer circumferential surface; and
a restoring force-offset layer attached to at least a substantial portion defining at least one of the inner circumferential surface and the outer circumferential surface and comprising a material having a thermal expansion coefficient different from the first thermal expansion coefficient.

21. The display device of claim 20, wherein
the restoring force-offset layer comprises an expansion layer attached to the outer circumferential surface, wherein the expansion layer comprises a second material having a second thermal expansion coefficient greater than the first thermal expansion coefficient.

22. The display device of claim 20, wherein the restoring force-offset layer comprises a contraction layer attached to the inner circumferential surface, wherein the contraction layer comprises a second material having a second thermal expansion coefficient smaller than the first thermal expansion coefficient.

23. A display device comprising:
a display panel;
a backlight unit disposed below the display panel to provide a light to the display panel; and
a bottom chassis disposed below the backlight unit and which accommodates the backlight unit,
wherein the bottom chassis is curved along a first direction,
a plurality of grooves is defined in an upper or lower surface of the bottom chassis and the grooves are arranged in the first direction, the plurality of grooves are arranged in a one-dimensional grating.

24. The display device of claim 23, wherein each of the grooves extends substantially parallel to a second direction different from the first direction.

* * * * *